(12) United States Patent
Mehta et al.

(10) Patent No.: US 12,101,344 B2
(45) Date of Patent: Sep. 24, 2024

(54) MULTI-LEVEL LOG ANALYSIS TO DETECT SOFTWARE USE ANOMALIES

(71) Applicant: MORGAN STANLEY SERVICES GROUP INC., New York, NY (US)

(72) Inventors: Mehak Mehta, Jersey City, NJ (US); Shailesh Gavankar, Princeton, NJ (US); Suryakant Brahmbhatt, New York, NY (US)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 115 days.

(21) Appl. No.: 18/112,490

(22) Filed: Feb. 21, 2023

(65) Prior Publication Data
US 2023/0328088 A1 Oct. 12, 2023

Related U.S. Application Data

(63) Continuation of application No. 17/716,946, filed on Apr. 8, 2022, now Pat. No. 11,588,843.

(51) Int. Cl.
*H04L 43/00* (2022.01)
*G06N 20/20* (2019.01)
*H04L 9/40* (2022.01)
*H04L 43/045* (2022.01)

(52) U.S. Cl.
CPC ......... *H04L 63/1425* (2013.01); *G06N 20/20* (2019.01); *H04L 43/045* (2013.01)

(58) Field of Classification Search
CPC .... H04L 63/1425; H04L 43/045; G06N 20/20
See application file for complete search history.

(56) References Cited

U.S. PATENT DOCUMENTS

| | | | |
|---|---|---|---|
| 9,525,696 B2 | 12/2016 | Kapoor et al. | |
| 10,445,311 B1 | 1/2019 | Saurabh | |
| 10,884,891 B2 | 1/2021 | Awad | |
| 11,336,507 B2 | 5/2022 | Acharjee | |
| 11,483,329 B1 | 10/2022 | Singh | |
| 2005/0037733 A1 | 2/2005 | Coleman et al. | |
| 2005/0076111 A1* | 4/2005 | Cherkasova | G06Q 30/00 709/224 |
| 2014/0096249 A1 | 4/2014 | Dupont et al. | |
| 2014/0157405 A1 | 6/2014 | Joll et al. | |
| 2015/0161394 A1 | 6/2015 | Ferragut et al. | |

(Continued)

*Primary Examiner* — Khai M Nguyen
(74) *Attorney, Agent, or Firm* — Weitzman Law Offices, LLC (57) ABSTRACT

A computer-implemented method for identifying a use anomaly potentially exposing sensitive data is disclosed. The method comprises receiving data comprising logs of a communication involving a computing device, where the logs comprise distinct logs of at least three communication abstraction levels. At least three anomaly classifiers are operated for logs from each of the at least three communication abstraction levels. An ensemble model is used to identify an anomaly in the communication, by processing output from each of the at least three anomaly classifiers. The various logs from a moment in time when the anomaly occurred are collated, and a graphical user interface is generated for reviewing the identified anomaly and collated logs. A human reviewer is then alerted that an anomaly has been identified.

14 Claims, 5 Drawing Sheets

(56) References Cited

U.S. PATENT DOCUMENTS

| | | |
|---|---|---|
| 2016/0191549 A1 | 6/2016 | Nguyen et al. |
| 2016/0371489 A1* | 12/2016 | Puri ................... G06F 16/254 |
| 2017/0063889 A1 | 3/2017 | Muddu et al. |
| 2017/0063909 A1 | 3/2017 | Muddu et al. |
| 2017/0134415 A1 | 5/2017 | Muddu et al. |
| 2017/0223036 A1 | 8/2017 | Muddu et al. |
| 2018/0082208 A1 | 3/2018 | Cormier et al. |
| 2018/0146000 A1 | 5/2018 | Muddu et al. |
| 2018/0219898 A1 | 8/2018 | Christian |
| 2018/0302423 A1 | 10/2018 | Muddu et al. |
| 2019/0132346 A1 | 5/2019 | Christian |
| 2019/0173893 A1 | 6/2019 | Muddu et al. |
| 2020/0126037 A1* | 4/2020 | Tatituri ................ G06N 20/00 |
| 2020/0145381 A1 | 5/2020 | Morin |
| 2020/0304523 A1 | 9/2020 | Yadav et al. |
| 2020/0322362 A1 | 10/2020 | Park et al. |
| 2020/0389469 A1 | 12/2020 | Litichever et al. |
| 2021/0406106 A1* | 12/2021 | Moss ................. G06F 11/0706 |
| 2022/0012625 A1* | 1/2022 | Ben-Itzhak ........... G06N 20/00 |

\* cited by examiner

MULTI-LEVEL LOG ANALYSIS TO DETECT SOFTWARE USE ANOMALIES

CROSS REFERENCE TO RELATED APPLICATIONS

This application is a continuation of and claims priority to U.S. patent application Ser. No. 17/716,946, filed Apr. 8, 2022, and also titled "Multi-Level Log Analysis to Detect Software Use Anomalies", which is hereby incorporated by reference in its entirety.

FIELD OF INVENTION

This disclosure relates to systems and methods for automatically analyzing computing activity at multiple levels of a protocol stack or network stack, and more specifically, to systems and methods for identifying anomalous use of applications or networks to access sensitive or prohibited data or transmit the data through a network.

BACKGROUND

Organizations of all types routinely have data that is sensitive and tightly-controlled. Such data may include confidential communications with an organization's clients or contractors; trade secrets or other information relevant to a business' future plans and ability to compete in a marketplace; personally identifying information, medical, educational, or other data with privacy controls defined by law; or even military secrets pertaining to national defense. Although it may be ideal to design systems such that members of an organization cannot access data to which they lack authorization, or cannot transmit sensitive data outside the organization, networks and software may lack functionality needed to prevent it. If members of an organization intentionally or negligently disclose sensitive data, their actions may expose the organization to a spectrum of consequences, including reputational, monetary, legal, or even existential risk.

A malicious member may be motivated by a desire to blackmail his employers or perform industrial espionage against them. An innocuous member may nonetheless be tricked by social engineering or phishing into clicking a link and unwittingly loading software that accesses and moves data without warning. Regardless of the motivation or means, the result of this intentional or negligent action may trigger the downloading of sensitive data onto a computing device associated with the member and/or transmission of the sensitive data outside of the organization's network.

Although a wealth of information is often available to potentially detect such actions, present detection systems are often limited to crude analysis such as searches for keywords in users' activity, or manual review of logs by a human agent. Such systems may fail to identify unauthorized activity at all, or may only identify it days or weeks after it has already been completed. As a consequence, there are advantages to having a system that can automatically and as quickly as possible identify an anomalous use pattern suggesting that a member of the organization is accessing sensitive data, preparing to transmit sensitive data, or successfully transmitting sensitive data outside of the organization's networks without authorization.

SUMMARY OF THE INVENTION

A computer-implemented method for identifying a use anomaly potentially exposing sensitive data is disclosed. The method comprises receiving data comprising logs of a communication involving a computing device, where the logs comprise distinct logs of at least three communication abstraction levels. At least three anomaly classifiers are operated for logs from each of the at least three communication abstraction levels. An ensemble model is used to identify an anomaly in the communication, by processing output from each of the at least three anomaly classifiers. The various logs from a moment in time when the anomaly occurred are collated, and a graphical user interface is generated for reviewing the identified anomaly and collated logs. A human reviewer is then alerted that an anomaly has been identified.

Similarly, a system for identifying a use anomaly potentially exposing sensitive data is disclosed. The system comprises a server comprising one or more processors; a data store comprising the sensitive data; and non-transitory memory comprising instructions. When the instructions are executed by the one or more processors, they cause the one or more processors to perform the steps described above.

Additional features include variations of the above system and method where the first logs comprise application-level data gathered from a web-based interface or other user interface of an application, where the second logs comprise session-level data gathered from HTTP requests or other session-level protocol communications, and/or where the third logs comprise network-level data gathered from packets transmitted over a network.

BRIEF DESCRIPTION OF THE DRAWINGS

Other aspects, features and advantages will become more fully apparent from the following detailed description, the appended claims, and the accompanying drawings (provided solely for purposes of illustration without restricting the scope of any embodiment), of which:

DETAILED DESCRIPTION

In order to address the issue of a computer user's unauthorized access to or disclosure of sensitive data, a system is provided for analyzing multiple layers of data in parallel to quickly identify use anomalies that represent possible misuse of computing resources.

When a user uses a web-based application or any other application with a user interface to access data stored in a remote computing device, the communication may be characterized in multiple layers of varying abstraction, according to the traditional Open Systems Interconnection (OSI) model. At the most basic level, all communications between computers are broken down into a series of bits transmitted through a physical connection, such as a fiber optic, copper wire, or wireless radio wave. However, the software operating at the origin and destination nodes may conceptually group these bits into increasingly abstract level of representation such as frames, packets, segments, sessions, files, commands, interfaces, and so on. At each level of abstraction, it is possible that some information that indicates sensitive data leakage or other data-related issues may be present, while other critical information is absent.

For example, at the network packet level, the use of encryption may make it impossible to tell what the contents of any given packet are and whether the contents have any significance. However, the header of the packet cannot be encrypted, so the IP address of the recipient in the header may indicate that the recipient is not on the internal network, or the total number of packets sent to a particular recipient may betray the volume of data being sent. Either of these considerations may be a red flag that a user is performing an unauthorized transfer of data outside of the user's organization. At the session level, a particular node may not know what network packets have been generated to perform a transaction in the HTTP protocol or another protocol. However, the URL or other unique identifiers associated with the transaction may be present, and may have clues such as a transmission to URL at a different domain, or the presence of keywords associated with an organization's competitor in the URL. At the application level, logging software on a user's computer may not be aware of the packets or protocols used to accomplish a task, but may be able to track what user interface elements are being generated within a user interface, and what actions the user is taking to interact with those elements. Clicking "Download" on a data provisioning interface with which a user does not normally interact may indicate malicious activity or that automated software is performing a macro without the user's knowledge.

Tracking activity at multiple levels of the OSI model for communication can, as a result, greatly improve the accuracy of classifiers and identify possible data breaches that might "slip through the cracks" when reviewed through only one methodology at one level of the OSI model.

Figure 1:
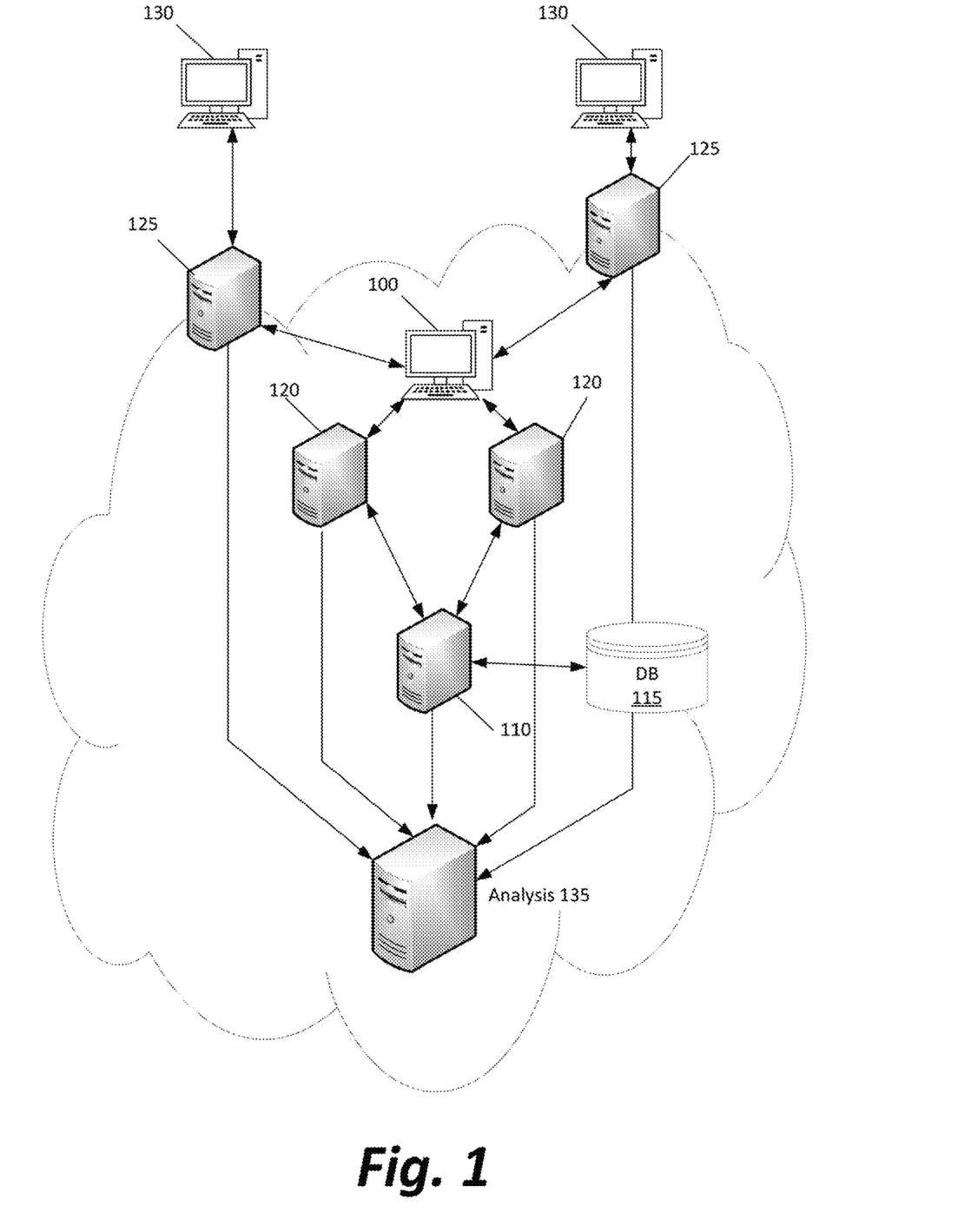
FIG. 1 illustrates, in simplified form, a system of computing devices used to access sensitive data in a protected network.

FIG. 1 illustrates, in simplified form, a system of computing devices used to access sensitive data in a protected network.

As depicted in FIG. 1, a user computing device 100, connected to an organization's internal network 105, may be used to connect to a server 110 on the same network and transmit information to and/or receive information from that server. Sensitive information may be stored on the server 110 or in an external database 115 to which the server connects and provides data in response to queries, API calls, or other means of responding to external requests for information. In a preferred embodiment, the server 110 may be a web server that provides a number of web-based applications that are accessed via a web browser on the user computing device 100.

Along the network path between the user computing device 100 and the server 110 may be a number of internal network routers 120 or other devices capable of acting as a tap to monitor network traffic that is forwarded through said devices. Further, there may be a number of boundary network routers 125 acting as firewalls or network address translators at the boundary between the network 105 and other networks, such as the Internet generally, or other more limited public networks, such as a locally generated Wi-Fi network or other LAN, hotspot, etc. to which one or more other user computing devices 130 are connected.

Figure 2:
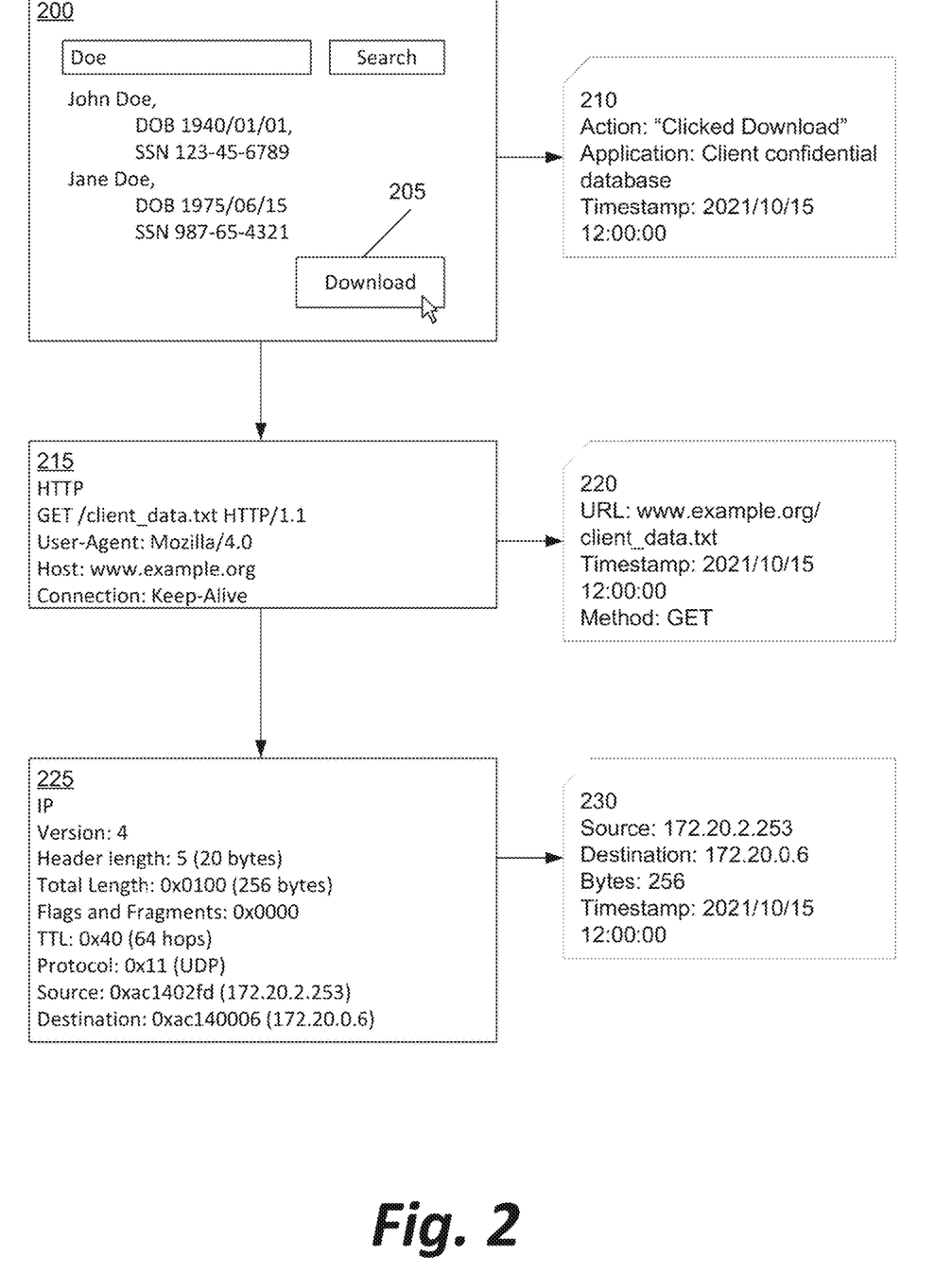
FIG. 2 illustrates, in simplified form, a series of data modules gathering and collating log information regarding a particular user's activities.
Figure 3:
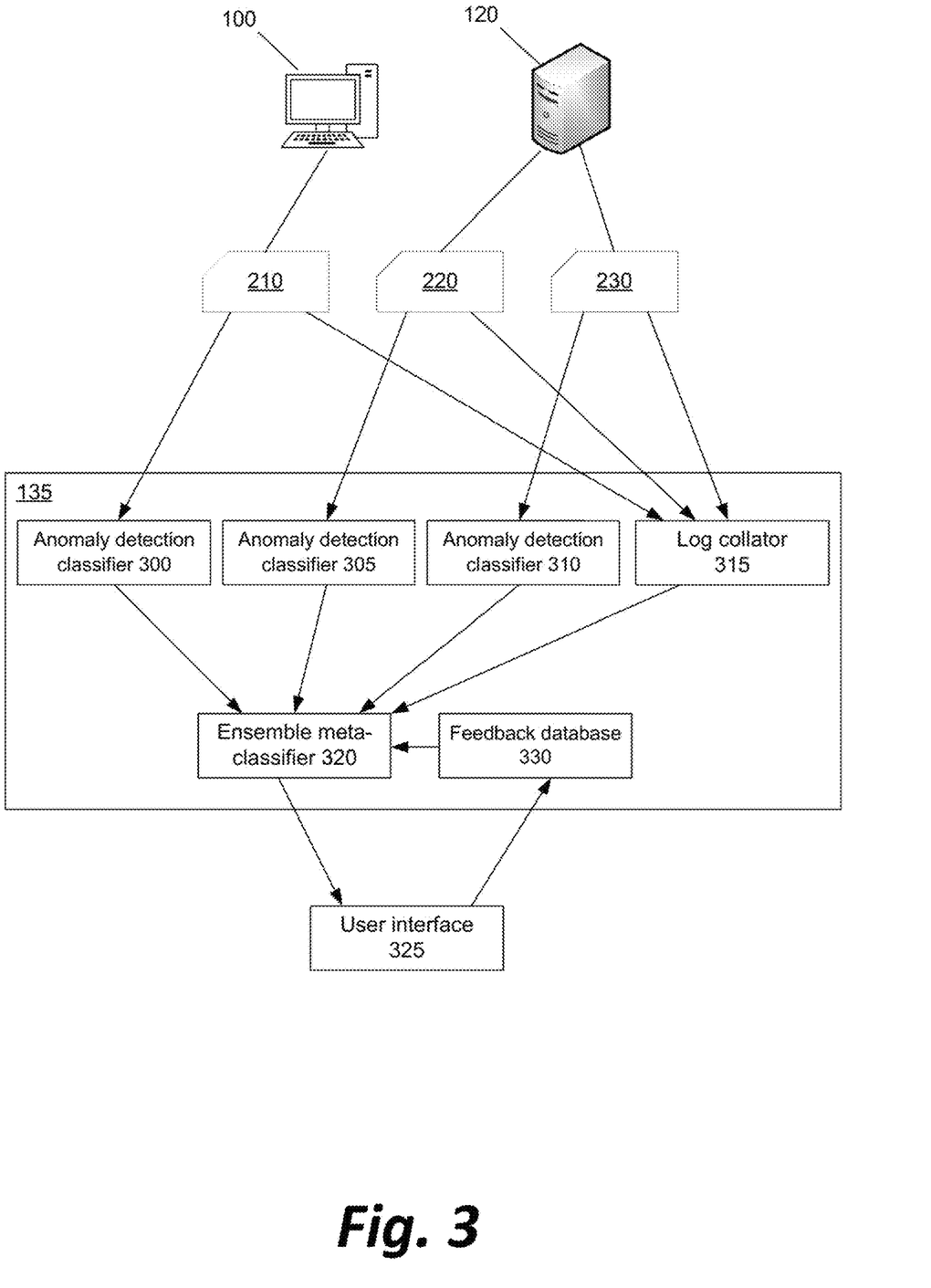
FIG. 3 illustrates, in simplified form, a set of software modules and their logical dependencies as they process a series of logs to identify a possible anomaly.
Figure 4:
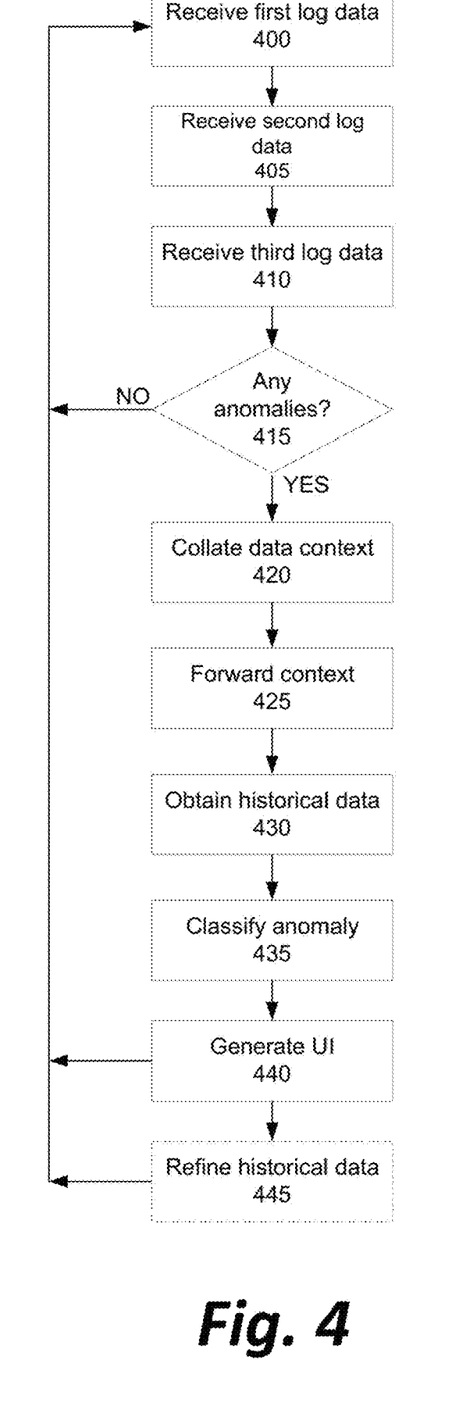
FIG. 4 illustrates, in simplified form, a method for analyzing logs to detect use anomalies in accordance with the features described in FIG. 3.

As these devices communicate with one another, a number of logs or other data strings are generated, as depicted in FIG. 2 and described in greater detail below. The logs or other data strings record various aspects of user activity in relation to software on the user computing device 100, or downstream effects of that activity, such as protocol requests performed, network packets created, and so on. These logs are forwarded to an analysis system 135 to be analyzed, as depicted in FIGS. 3 and 4 and described in greater detail below.

Although a particular division of functions between devices is described with relation to the systems depicted in FIG. 1, above, other configurations are possible in which functions are divided among devices differently. For example, all of the functions of some or all of the server 110, the database 115, and the analysis system 135 may be performed by a single device with multiple threads executing different software modules simultaneously.

Alternatively, each system or device from among the server 110, the database 115, and the analysis system 135 may in fact be a cluster of computing devices sharing functionality for concurrent processing. Further, although these various computing elements are described as if they are one computing device or cluster each, a cloud-based solution with multiple access points to similar systems that synchronize their data and are all available as backups to one another may be preferable in some embodiments to a unique set of computing devices all stored at one location. The specific number of computing devices and whether communication between them is network transmission between separate computing devices or accessing a local memory of a single computing device is not so important as the functionality that each part has in the overall scheme. What does remain of importance is that there is a network connection between a user computing device 100 and at least one other computing device, and that the actions of the user on the user computing device 100 and the resulting network conditions can be captured for objective measurement to predict future sensitive data leakage or identify past sensitive data leakage.

FIG. 2 illustrates, in simplified form, a series of data modules gathering and collating log information regarding a particular user's activities.

In one example embodiment, a user might use a web browser to access particular web-based user interface 200 as part of a web application. The interface may include a number of user interface elements 205 such as buttons, selectors/dropdowns, textboxes, datagrids, or other elements enabling the display of data, entry of data, or receipt of a user command. The web application or the browser is augmented with additional functionality, such as an analytics suite or custom event listener functions, providing the ability to detect interactions with the user interface 200 and record them as application-level log data 210. As depicted in FIG. 2, a user using a datagrid to access protected client information and to afterward click a "Download" button may cause the generation of application-level log data 210 that records the time and nature of each interaction. Various embodiments may record data at differing levels of granularity, ranging from only recording particular clicks that would trigger effects in the user interface, to recording every keystroke and the position of a cursor or mouse clicking state at every moment that the user interface is in use. Particular aspects of a user interface may be tagged in advance, so that, for example, a particular datagrid is noted to possibly display sensitive information, and a particular download button is noted to allow for sensitive data to be transmitted. These notes or tags may be incorporated into the application-level log data 210.

Although the present disclosure focuses on the design choices and features that would be present in a system for monitoring web applications, similar extensions of these features would be possible to non-web applications, such as word processing or other office productivity applications, web browsers in general, or custom-built software used by an organization.

As the web application actually loads files from the server 110, makes asynchronous function calls to the server 110 via an API, or otherwise interacts with the server, various session-level communications 215 occur. For example, clicking the datagrid to load client information may generate a first HTTP/HTTPS request to a first URL at the server, and clicking the "Download" button may generate a second HTTP/HTTPS request to a second URL, with different parameters for the request. Each HTTP/HTTPS request also causes an HTTP/HTTPS response to be transmitted. These requests and responses 215 can be captured at the user's computing device 100, the server 110, or a router 120 or 125 and saved in their entirety or in selected parts as extracted session-level data 220. The extracted data may include, for example, what URL a request was sent to, whether the request is a POST/GET/PUT/etc., what the response code is (whether "200" to indicate success or a specific other code to indicate a warning or failure), number of bytes transferred, or any other feature of the request or response. In other embodiments not reliant on HTTP/HTTPS communications, the communications format of other protocols may be considered in determining what data should be extracted.

Further, the transmission of the HTTP/HTTPS requests and the receipt of their responses requires conversion of the requests and responses into a stream of IP network packets 225. These packet streams 225 can be captured at the user's computing device 100, the server 110, or a router 120 and saved as extracted network-level data 230.

These extracted data 210, 220, 230 are routinely forwarded to the analysis system 135, made up of one or more computing devices, to be analyzed by various software models for possible anomalous behavior, as depicted in FIG. 3 and described in greater detail below.

FIG. 3 illustrates, in simplified form, a set of software modules and their logical dependencies as they process a series of logs to identify a possible anomaly.

In a preferred embodiment, the analysis system 135 simultaneously operates a first-level anomaly detection classifier 300, a second-level anomaly detection classifier 305, and a third-level anomaly detection classifier 310. In a preferred embodiment, these three anomaly detection classifiers review data on the application level, session level, and network level, respectively, and receive as inputs the previously-mentioned extracted data 210, 220, 230. In other embodiments, different communication levels may have their extracted data analyzed, or the extracted data for a same communication level may be different based on application requirements. In other embodiments, more than three classifiers may be incorporated.

It will often be the case that a network-level classifier (e.g., 230) can be implemented a single time and detect network-level anomalies regardless of the application or protocol involved in the communication (for example, by analyzing solely the volume, timing, destination, or origin of streams of packets). A session-level classifier (e.g., 220) or an application-level classifier (e.g., 210) may need to be trained for each possible communications protocol or each possible application, based on underlying structural differences in the data available for extraction in each case.

Each of the three or more classifiers may use any of a variety of techniques to classify incoming data as a possible anomaly, including, by non-limiting example only, a k-means clusterer, a probability density estimation, kernel density estimation, isolation forest, or other forms of machine learning techniques to identify outliers in a data set. Each of the three or more classifiers may establish certain baseline behavior for all users generally and/or each user specifically, in order to identify behavior that is anomalous for a user based on that user's history, based on the history of other users with a same organizational role as the user, and/or based on the history of all users regardless of role. For example, it might be the case that a particular human operator downloading 100 GB of client data is completely normal based on that user's role and past authorization to perform data analysis tasks requiring that data, while another particular human operator downloading 1 GB of client data is immediately flagged based on the user's role not requiring access to said data, or all past downloads by the user being limited to one megabyte or less.

Network-level classifiers may rely on, for example, source IP address, destination IP address, total volume of packets, total data transmitted, total data transmitted during a particular window, or other factors. Session-level classifiers may rely on, for example, URLs in requests, other header elements of requests, content of responses, codes or other header elements in responses, or other factors. Application-level classifiers may rely on timing of interactions with a UI, volume of interactions with a UI, tagging of UI elements that have been interacted with, keyword searches of content or queries originated by a user, or other factors.

When any anomaly is detected, each classifier forwards log data to a log collator 315. By establishing a data structure that includes timestamped log data from all three or more data sources interweaved into a single sequence, it can be much easier to correlate a particular network-level event or session-level event to the application-level event that triggered it. Conversely, if an application-level event appears suspicious, it is helpful to know what network-level events or session-level events were triggered by it to see if the downstream events are also suspicious, or are innocuous (for example, if a user clicks a "Download All" button that could indicate an attempt to download a massive amount of sensitive data, and even though the session may show only one record returned, network data shows thousands of records for packets downloaded that for the given database query).

Data from the log collator 315 and the classifiers are forwarded to a meta-classifier 320 that uses an ensemble analysis with multiple classifiers to make a final determination as to the existence and severity of a possible data breach based on anomalies identified by the classifiers 300, 305, 310. The meta-classifier 320 also incorporates information from a feedback database 330, described further below, to refine its classifications based on past classifications.

The results of the classification and the collated log data used to come to that classification are forwarded to a user interface 325 to enable human review of the possible data breach and human confirmation or refutation of the meta-classifier's output. The user interface 325 may have, for example, elements that allow a human operator to indicate that an identified anomaly has been correctly classified, that it should be changed to a higher or lower level of severity, and/or that an identified anomaly is not likely to represent a data breach at all. The user interface may allow review of the collated log data for the incident, historical log data for the particular user involved, historical log data in aggregate for multiple users, past log data regarding data breaches from other users, or any other data that may be of help to a human operator in understanding why an anomaly may represent a data breach.

Whether a human operator confirms or refutes the analysis, the human operator's response is stored in a feedback database 330 that stores historical cyber-incidents and their final, human-assigned classifications, as well as false positives with a note that they were deemed by a human operator not to have been a data breach or other cyber incident. The meta-classifier 320 is able to incorporate this information and further refine its future classifications based on similarity of future events to past events that have a definitive classification assigned to them.

Although the user interface 325 is depicted separately from the other modules of the analysis system 135, there is no reason that the user interface cannot be hosted by the analysis system 135 as opposed to a separate web server.

FIG. 4 illustrates, in simplified form, a method for analyzing logs to detect use anomalies in accordance with the features described in FIG. 3.

First, the first-level anomaly detection classifier 300 receives first-level log data for analysis (Step 400), for example, the extracted application-level data 210, and, using whatever machine learning technique(s) the classifier has been trained with, determines whether or not the received data indicates a possible anomaly based on previous use information.

Second, the second-level anomaly detection classifier 305 receives second-level log data for analysis (Step 405), for example, the extracted session-level data 220, and, using whatever machine learning technique(s) the classifier has been trained with, determines whether or not the received data indicates a possible anomaly based on previous use information.

Third, the third-level anomaly detection classifier 310 receives third-level log data for analysis (Step 410), for example, the extracted network-level data 230, and, using whatever machine learning technique(s) the classifier has been trained with, determines whether or not the received data indicates a possible anomaly based on previous use information.

The preceding three receipt and analysis steps (400, 405, 410) may occur in sequence or in parallel, and because they are substantially independent of one another, they may also occur in any order, so long as their output and identification of possible anomalies is made available to the ensemble model meta-classifier.

If no anomaly is identified by any of the classifiers (Step 415), the system returns to receiving additional use data to be classified (back to Step 400).

If an anomaly is reported by any of the classifiers, the system collates data in a time-based data structure (Step 420) that allows the context of the identified anomaly and the sequence of all events to be viewed even including events from communication levels whose classifiers did not identify a possible anomaly.

For each instance of an identified anomaly, the contextual data from the collation is forwarded to the ensemble meta-classifier (Step 425).

The ensemble meta-classifier also obtains historical cyber incident data (Step 430) to refine analysis and minimize the chances of returning a false negative or a false positive, since the historical cyber incident data store may include examples of true incidents that were not identified correctly by the meta-classifier, or examples of non-incidents that accidentally triggered the meta-classifier.

The ensemble meta-classifier makes a final determination of the existence and severity of an anomaly based on each provided classification, context, and historical data (Step 435). In a preferred embodiment, all anomalies are identified with a "High", "Medium", or "Low" tag based on the confidence the classifiers have that an apparent anomaly represents a data breach and the threat level that it may represent (based on the volume or contents of the transfer). The meta-classifier may assign special weight to the simultaneous triggering of multiple input classifiers, but may still determine that an anomaly is a danger based on the triggering of only one classifier and the other classifiers indicating normal conditions.

After the anomaly has been identified and classified, the results, along with the contextual information and any other information, are loaded into a user interface for human review (Step 440). At the same time, an alert may be generated to one or more human operators (such as an email, SMS text message, operating system notification, notification within a browser or web application, etc.) informing the human operators that an anomaly has been identified and requires human review.

Optionally, after the human review confirms or refutes that the anomaly represents a data breach, that feedback is used to refine the operation of the meta-classifier (Step 445). A database may be maintained that stores historical cyber incident data and how the meta-classifier responded to those incidents. Consequently, based on similarity between a future incident that would be given a particular classification and a past incident that was definitively given a different classification based on human review, the meta-classifier may be weighted to adjust its classification of the future incident to match or approach the classification given to the similar past incident. This feedback loop helps to improve the accuracy of the meta-classifier over time as the historical cyber incident database fills with examples and errors or biases in the meta-classifier's training data can be minimized or mitigated.

Although FIG. 1 depicts a preferred configuration of computing devices and software modules to accomplish the software-implemented methods described above, those methods do not inherently rely on the use of any particular specialized computing devices, as opposed to standard desktop computers and/or web servers. For the purpose of illustrating possible such computing devices, FIG. 5, below, describes various enabling devices and technologies related to the physical components and architectures described above.

Figure 5:
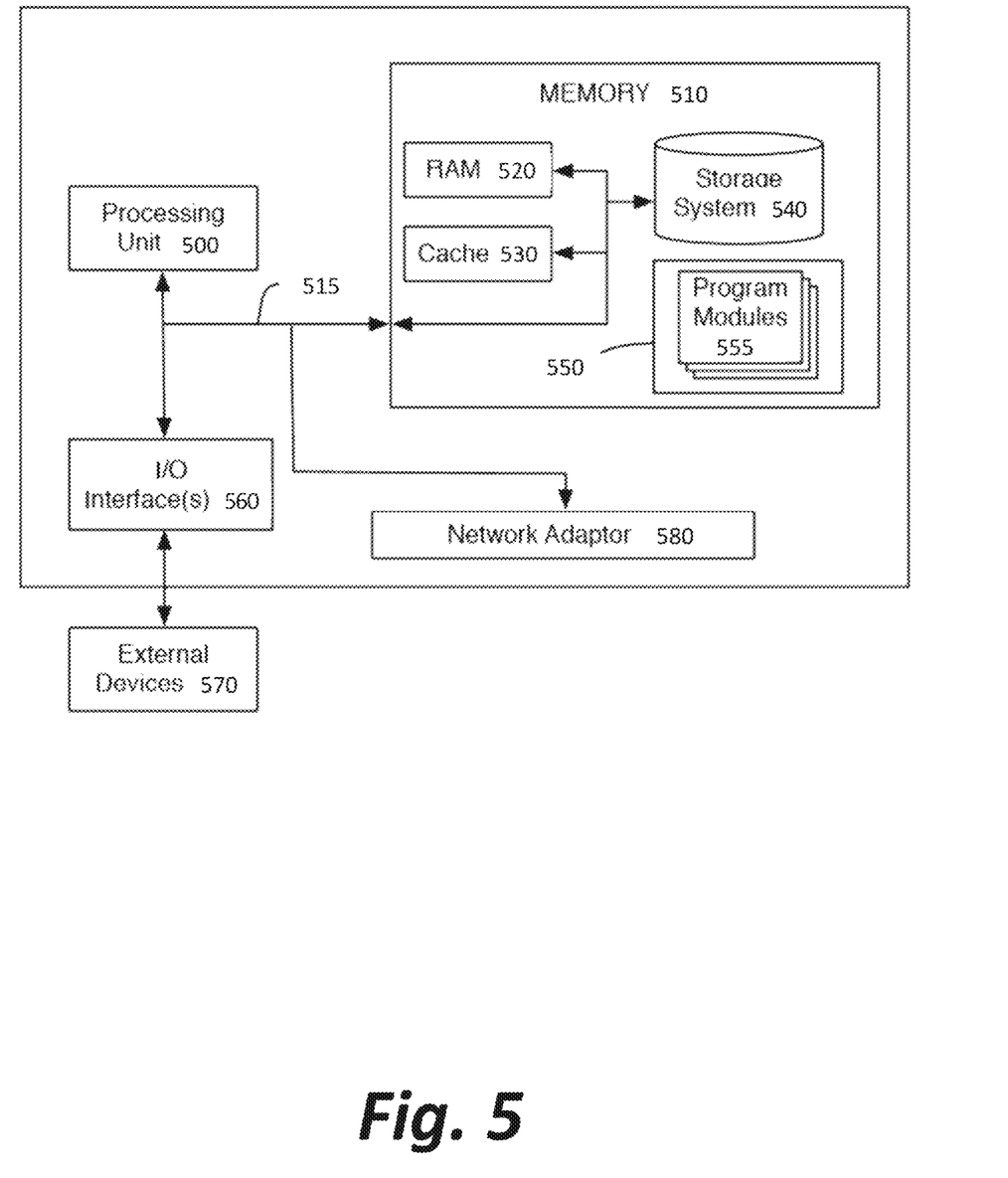
FIG. 5 is a high-level block diagram of a representative computing device that may be utilized to implement various features and processes described herein.

FIG. 5 is a high-level block diagram of a representative computing device that may be utilized to implement various features and processes described herein, for example, the functionality of the user computing device 100, the server 110, the database 115, the routers 120 and 125, the analysis system 135, or any other computing device described. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 5, the computing device is illustrated in the form of a special purpose computer system. The components of the computing device may include (but are not limited to) one or more processors or processing units 500, a system memory 510, and a bus 515 that couples various system components including memory 510 to processor 500.

Bus 515 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 500 may execute computer programs stored in memory 510. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 500 may be used.

The computing device typically includes a variety of computer system readable media. Such media may be any available media that is accessible by the computing device, and it includes both volatile and non-volatile media, removable and non-removable media.

System memory 510 can include computer system readable media in the form of volatile memory, such as random access memory (RAM) 520 and/or cache memory 530. The computing device may further include other removable/non-removable, volatile/non-volatile computer system storage media. By way of example only, storage system 540 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 515 by one or more data media interfaces. As will be further depicted and described below, memory 510 may include at least one program product having a set (e.g., at least one) of program modules that are configured to carry out the functions of embodiments described in this disclosure.

Program/utility 550, having a set (at least one) of program modules 555, may be stored in memory 510 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 570 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 560.

In addition, as described above, the computing device can communicate with one or more networks, such as a local area network (LAN), a general wide area network (WAN) and/or a public network (e.g., the Internet) via network adaptor 580. As depicted, network adaptor 580 communicates with other components of the computing device via bus 515. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for identifying a use anomaly potentially exposing sensitive data, comprising:
    a server comprising one or more processors;
    a data store comprising the sensitive data; and
    non-transitory memory comprising instructions that, when executed by the one or more processors, cause the one or more processors to:
        receive data comprising logs of an ongoing communication between a first computing device and a second computing device, the logs comprising first logs of a first communication abstraction level between the first computing device and the second computing device, second logs of a second communication abstraction level between the first computing device and the second computing device, and third logs of a third communication abstraction level between the first computing device and the second computing device;
        input the first logs to a first anomaly classifier;
        input the second logs to a second anomaly classifier different from the first anomaly classifier;
        input the third logs to a third anomaly classifier different from the first or second anomaly classifier;
        in response to any one anomaly classifier of the three anomaly classifiers identifying a possible anomaly in the ongoing communication at one communications abstraction level, determine, via an ensemble model meta-classifier, that an anomaly has occurred based on one or both of the other anomaly classifiers of the three anomaly classifiers also identifying a possible anomaly in the ongoing communication at one or both other communications abstraction levels at a same time as the possible anomaly in the ongoing communication at the one communications abstraction level; and
        generate and transmit an electronic communication indicating that an anomaly has been identified.

2. The system of claim 1, wherein the first, second, and third communication abstraction levels are levels of the Open Systems Interconnection model.

3. The system of claim 2, wherein the first logs comprise application-level data gathered from a web-based interface.

4. The system of claim 2, wherein the second logs comprise session-level data gathered from HTTP/HTTPS requests.

5. The system of claim 2, wherein the third logs comprise network-level data gathered from packets transmitted over a network.

6. The system of claim 1, wherein a graphical user interface is used by a human reviewer to confirm or reject an identified anomaly as an unauthorized data leak, wherein confirmation or rejection is stored in a historical incident database, and wherein the ensemble model meta-classifier identifies the anomaly additionally based at least in part on data received from the historical incident database.

7. The system of claim 1, wherein the first logs, second logs, and third logs are collated in chronological order in a user interface showing the logs before, during, and after the identified same time of the anomaly.

8. A computer-implemented method for identifying a use anomaly potentially exposing sensitive data, comprising:
- receiving data comprising logs of an ongoing communication between a first computing device and a second computing device, the logs comprising first logs of a first communication abstraction level between the first computing device and the second computing device, second logs of a second communication abstraction level between the first computing device and the second computing device, and third logs of a third communication abstraction level between the first computing device and the second computing device;
- inputting the first logs to a first anomaly classifier;
- inputting the second logs to a second anomaly classifier different from the first anomaly classifier;
- inputting the third logs to a third anomaly classifier different from the first or second anomaly classifier;
- in response to any one anomaly classifier of the three anomaly classifiers identifying a possible anomaly in the ongoing communication at one communications abstraction level, determining, via an ensemble model meta-classifier, that an anomaly has occurred based on one or both of the other anomaly classifiers of the three anomaly classifiers also identifying a possible anomaly in the ongoing communication at one or both other communications abstraction levels at a same time as the possible anomaly in the ongoing communication at the one communications abstraction level; and
- generating and transmitting an electronic communication indicating that an anomaly has been identified.

9. The method of claim 8, wherein the first, second, and third communication abstraction levels are levels of the Open Systems Interconnection model.

10. The method of claim 9, wherein the first logs comprise application-level data gathered from a web-based interface.

11. The method of claim 9, wherein the second logs comprise session-level data gathered from HTTP/HTTPS requests.

12. The method of claim 9, wherein the third logs comprise network-level data gathered from packets transmitted over a network.

13. The method of claim 8, wherein a graphical user interface is used by a human reviewer to confirm or reject an identified anomaly as an unauthorized data leak, wherein confirmation or rejection is stored in a historical incident database, and wherein the ensemble model meta-classifier determines the anomaly has occurred additionally based at least in part on data received from the historical incident database.

14. The method of claim 8, wherein the first logs, second logs, and third logs are collated in chronological order in a user interface showing the logs before, during, and after the identified same time of the anomaly.

* * * * *